(12) United States Patent
Backfolk et al.

(10) Patent No.: US 11,598,050 B2
(45) Date of Patent: Mar. 7, 2023

(54) PROCESS FOR PROVIDING COATING LAYER COMPRISING MICRO FIBRILLATED CELLULOSE

(71) Applicant: Stora Enso OYJ, Helsinki (FI)

(72) Inventors: Kaj Backfolk, Villmanstrand (FI); Isto Heiskanen, Imatra (FI); Esa Saukkonen, Lappeenranta (FI)

(73) Assignee: Stora Enso OYJ, Helsinki (FI)

( * ) Notice: Subject to any disclaimer, the term of this patent is extended or adjusted under 35 U.S.C. 154(b) by 883 days.

(21) Appl. No.: 16/345,982

(22) PCT Filed: Oct. 26, 2017

(86) PCT No.: PCT/IB2017/056649
§ 371 (c)(1),
(2) Date: Apr. 29, 2019

(87) PCT Pub. No.: WO2018/078558
PCT Pub. Date: May 3, 2018

(65) Prior Publication Data
US 2020/0056333 A1    Feb. 20, 2020

(30) Foreign Application Priority Data

Oct. 31, 2016 (SE) ................ SE1651432-5

(51) Int. Cl.
*D21H 19/34* (2006.01)
*D21H 23/50* (2006.01)
*D21H 27/10* (2006.01)
*D21J 1/08* (2006.01)

(52) U.S. Cl.
CPC ............. *D21H 19/34* (2013.01); *D21H 23/50* (2013.01); *D21H 27/10* (2013.01); *D21J 1/08* (2013.01)

(58) Field of Classification Search
CPC ........ D21H 19/34; D21H 23/50; D21H 27/10; D21H 11/18; D21H 19/16; D21H 19/52; D21H 21/16; D21J 1/08; D21J 3/00; D21J 5/00; D21J 7/00; B32B 2037/243; B32B 37/24; B29C 33/60; B29C 33/56; B29C 37/0025; B29C 37/0028; B29C 37/0067; B65D 1/00
See application file for complete search history.

(56) References Cited

U.S. PATENT DOCUMENTS

| 8,231,764 | B2 | 7/2012 | Husband et al. |
| 8,241,756 | B2 | 8/2012 | Ankerfors et al. |
| 10,100,215 | B2 | 10/2018 | Zischka et al. |
| 10,138,599 | B2 | 11/2018 | Aulin et al. |
| 10,253,457 | B2 | 4/2019 | Husband et al. |
| 2010/0116708 | A1 | 5/2010 | Carcano et al. |
| 2010/0129642 | A1 | 5/2010 | Gröndahl et al. |
| 2016/0348318 | A1* | 12/2016 | Koenig ............... D21H 27/10 |

FOREIGN PATENT DOCUMENTS

| CN | 101481562 |   | 7/2009 |   |
| CN | 103210144 | A | 7/2013 |   |
| CN | 105332306 | A | 2/2016 |   |
| CN | 105408223 | A | 3/2016 |   |
| JP | H1095803 | A | 4/1998 |   |
| JP | 2000054300 |   | 2/2000 |   |
| JP | 2000054300 | A * | 2/2000 |   |
| JP | 2010156068 | A | 7/2010 |   |
| JP | 2010527384 | A | 8/2010 |   |
| JP | 2011516739 | A | 5/2011 |   |
| JP | 2014050835 |   | 3/2014 |   |
| JP | 2018504529 | A | 2/2018 |   |
| RU | 2589671 |   | 7/2016 |   |
| WO | WO-2007088974 | A1 * | 8/2007 | ............... B05D 5/08 |
| WO | 2016082025 |   | 6/2016 |   |
| WO | 2016097964 |   | 6/2016 |   |

OTHER PUBLICATIONS

International Searching Authority, Written Opinion of the International Searching Authority, PCT/IB2017/056649, dated May 3, 2018.
International Searching Authority, International Search Report, PCT/IB2017/056649, dated May 3, 2018.
Chinga-Carrasco, G., "Cellulose fibres, nanofibrils and microfibrils,: The morphological sequence of MFC components from a plant physiology and fibre technology point of view," Nanoscale research letters 2011, 6:417.
Fengel, D., "Ultrastructural behavior of cell wall polysaccharides," Tappi J., Mar. 1970, vol. 53, No. 3.
Prakobna, K. et al., "Core-Shell Cellulose Nanofibers for Biocomposites—Nanostructural Effects in Hydrated State," Carbohydrate Polymers, 2015, vol. 125, p. 92-102.

* cited by examiner

*Primary Examiner* — Jacob T Minskey
*Assistant Examiner* — Matthew M Eslami
(74) *Attorney, Agent, or Firm* — Greer, Burns & Crain, Ltd.

(57) ABSTRACT

The present invention relates to a new process for providing a coating layer on a moulded article comprising fibers. In the present invention, a coating dispersion is prepared that comprises microfibrillated cellulose (MFC), a slip aid and at least one hydrocolloid.

10 Claims, No Drawings

PROCESS FOR PROVIDING COATING LAYER COMPRISING MICRO FIBRILLATED CELLULOSE

This application is a U.S. National Phase under 35 U.S.C. § 371 of International Application No. PCT/IB2017/056649, filed Oct. 26, 2017, which claims priority under 35 U.S.C. §§ 119 and 365 to Swedish Application No. 1651432-5, filed Oct. 31, 2016.

TECHNICAL FIELD

The present invention relates to a new process for providing a coating layer on a moulded article comprising fibers. In the present invention, a coating dispersion is prepared that comprises microfibrillated cellulose (MFC), a slip aid and at least one hydrocolloid.

BACKGROUND

Perfluorinated carboxylic acids or PFCAs are the breakdown products of chemicals used to make non-stick and water- and stain-repellent products ranging from kitchen pans to clothing to food packaging. PFCAs, the best known of which is perfluorooctanoic acid (PFOA), are found in humans all around the world. A major source of human PFCA exposure may be the consumption and metabolism of polyfluoroalkyl phosphate esters or PAPs. PAPs are applied as greaseproofing agents to paper food contact packaging such as fast food wrappers and microwave popcorn bags. PFOA is the best-known perfluoro carboxylic acid (PFCA). Perfluorocarboxylic acids are the final degradation products (under normal conditions) of a wide range of other perfluorinated compounds.

Fluorotelomer alcohols (FTOH) are used as surfactants and intermediates in the manufacture of a variety of products. All fluorinated substances used for creating water/grease repellence paper/cardboard are FTOH derived polymers. Fluorotelomer alcohols (FTOHs) have been shown to degrade to low levels of perfluorocarboxylic acids (PFCAs), including perfluoro octanoic acid (PFOA), in atmospheric, biodegradation, and metabolism studies.

Impregnation or surface treatment of paper/cardboard with FTOH derived polymers or additives can provide both grease, oil and water repellence. Products treated this way are used for both food contact (plates, food containers, bags, and wraps) and non food contact applications.

The link between FTOH and PFCA occurs on two levels. Firstly, production of 2-perfluorodecylethanol (8:2 FTOH) causes unintended production of PFOA. Secondly, due to the stability of perfluorocarboxylic acids, these are the likely final environmental degradation products of telomer alcohols.

Thereby, migration of fluorocompounds at significant levels has been documented for e.g., food wrappers and microwave popcorn bags as well as moulded packaging.

In addition, when recycled fibers are used in manufacturing of the grease and water repellent product for food contact there is a risk for mineral oil hydrocarbons (MOH) migration. Several reports show that migration of mineral oil hydrocarbons (MOH) from recycled board into food can occur. Sources of mineral oils saturated hydrocarbons (MOSH) and mineral oil aromatic hydrocarbons (MOAH) are inks, adhesives and solvents.

Therefore, it would be desirable to avoid the use of fluorocompounds, particularly in packages that may come into contact with food. A further problem associated with manufacturing of moulded articles is stickiness or adhesion to female or male used in moulding. The moulded article has a tendency to stick to various surfaces. The male or female moulds used can be non-permeable, non-permeable textured or smooth, or semi-permeable or permeable such as wire fabrics. It is also possible that male or female have different properties in terms of material properties or physical properties such as permeability or smoothness.

WO2016/082025 discusses coating compositions comprising a multivalent metal salt complexed with nanocellulose and lignin. The coating composition is used to coat surfaces of e.g. packaging material to produce a hydrophobic surface.

WO2016/097964 is directed to a process for production of a coated substrate comprising cellulosic fibers, wherein the substrate has a dry content of less than 50% and wherein the coating composition, which comprises microfibrillated cellulose and optionally a water retention agent, is applied in an amount of more than 5 g/m$^2$ and wherein the substrate is dewatered after the coating composition has been applied.

RU2589671 discloses a method for producing hydrophobic and lipophobic paper, wherein a paper mass of microcrystalline cellulose is prepared in the form of a hydrogel, to which a dimer of alkyl ketene and polyamide polyamine epichlorohydrin resin is added and the hydrogel is used for producing paper.

There is a need for a surface treatment or coating method and a coating layer whereby the coated object or the coating is not only renewable but also has surface properties such that it can be used in packages for food and has adequate grease/oil resistance. In particular, there is a need for such a coating method and coating dispersion which is useful for coating moulded articles comprising fibers. In addition, the coating should preferably have properties that not only improves the properties but also facilitates the manufacturing of the moulded articles as well as repulpability and recycling.

SUMMARY

It is an object of the present disclosure to provide an improved method of providing a coating layer on the surface of a moulded article, which eliminates or alleviates at least some of the disadvantages of the prior art methods.

It has surprisingly been found that by using a certain coating method and coating dispersion, particularly including a slip aid and a hydrocolloid, adequate surface properties can be achieved without the use of metal salts or other components that are unsuitable for use in contact with food. The coating dispersion used in accordance with the present invention is particularly useful for spraying. It has been noted that clogging of spray nozzles is avoided when using the process and coating dispersion according to the present invention. Furthermore, the present invention provides barrier against mineral oil (MOSH/MOAH) migration, which is not achieved with fluorinated compounds. The present invention also facilitates the manufacturing of coated moulded articles. More complex shapes can be manufactured with higher precision and at higher speed.

According to a first aspect, there is provided a process for providing a coating layer on a surface of a moulded article, said coating layer comprising 1-10 g/m$^2$ (dry weight) microfibrillated cellulose, comprising the steps of:
a) providing a moulded article comprising fibers;
b) applying a coating dispersion on the surface of said moulded article, wherein said coating dispersion comprises microfibrillated cellulose, at least one slip aid and at least one hydrocolloid; and c) drying said applied coating dispersion to form the coating layer.

In one embodiment, the coating dispersion is applied to a surface of the moulded article by spraying. The coating may also be applied as a spot coating. The coating can be applied to one or more surfaces of the moulded article and can be applied in one or multiple layers. Thus, spraying can be used to provide multiple layers. The content of each layer sprayed onto the moulded article may be identical or different in the different layers, i.e. different coating dispersions may be used for different layers.

Moulded articles comprising fibers, such as natural fibers, such as lignocellulose fibers, wherein the articles are to be coated according to the present invention, can be manufactured using methods known in the art. In the production of moulded pulp packages, formation moulds typically descend in a vat filled with pulp. A vacuum sucks the pulp mixture onto the formation molds. The formation moulds contain a stainless steel mesh, which ensures an even vacuum through the mold so that the pulp is spread evenly. Moulded articles produced in this way typically have a rough surface. As used herein, the term moulded article encompasses a wet, semi-dry, dry moulded article as well as an interim product. Thus, the final shape of the moulded article may not necessarily be obtained until after the coating performed in step b). As used herein, the term moulded article does not encompass thermoset moulded articles. However, the moulded article may be a 3D printed article, provided that it comprises natural fibers. Fibers used in the moulded article can be, for example, lignocellulose fibers derived from wood or agriculture sources. It can also be recycled fiber such as deinked pulp. Other examples of pulps included are kraft pulp, dissolving pulp, CTMP, TMP, NSSC, reinforcement pulps, cellulose fines, sulphite pulps, pulps obtained from e.g. organosolv processes.

The concentration of microfibrillated cellulose in the coating dispersion is in the range of from 0.1 to 50%, such as from 0.1 to 20%. The amount of microfibrillated cellulose based on dry coat weight can be 10-99 wt-%, such as 10-90 wt-%.

The slip aid used in accordance with the present invention is an agent that reduces the interface tension between the surface of the mould and the moulded article. The slip aid facilitates the release of the moulded article from the mould and can also be referred to as a lubrication aid or an anti-stick agent or adhesion control agent. The slip aid typically has hydrophobic or oleophobic or amphiphobic or omniphobic properties and is suitable for or approved for use in contact with food, directly or indirectly. Examples of such slip aids include alkyl ketene dimer (AKD), wax such as paraffinic waxes, microcrystalline waxes, polyethylene waxes or bee waxes, silicone polyethers, stearate such as calcium stearate, glycerides, rosin resins, ASA emulsion, soy lecithin, polyethylene or propylene glycols and agents with similar properties that can be applied to a surface by spraying. The amount of slip aid used is typically 1-20 wt-% of the dry weight of the coating layer.

One example of a hydrocolloid useful in the context of the present invention is a cellulose derivative such as sodium carboxymethyl cellulose (CMC). The amount of hydrocolloid used is typically 0.1-49% of the dry weight of the coating. Other types of hydrocolloids, preferably bio-based, that can be used are e.g. starches, chitosan, proteins, hemicelluloses such as galactoglucomannan (GGM) or xyloglucan (XG), pectins, guar gums, alginate, etc. The hydrocolloid is typically a water soluble polymer that can be used to stabilize particles or emulsions and/or to adjust flow behavior of the said suspension. The hydrocolloid can also be used to adjust barrier properties or to control or improve film formation of the coating. The hydrocolloid can further be used with one or several surface active chemicals such as surfactants in order to provide enhanced colloidal stability to the system.

In one embodiment of the present invention, the microfibrillated cellulose has a Schopper Riegler value (SR°) of more than 85 SR°, or more than 90 SR°, or more than 92 SR°. The Schopper-Riegler value can be determined through the standard method defined in EN ISO 5267-1.

The microfibrillated cellulose preferably has a water retention value of at least 200%, more preferably at least 250%, most preferably at least 300%. The addition of certain chemicals may influence the water retention value.

The microfibrillated cellulose preferably has a surface area higher than 30 $m^2/g$, more preferably higher than 50 $m^2/g$, most preferably higher than 100 $m^2/g$. Surface area can be measured using the BET method, as known in the art. Solvent exchange may advantageously be carried out prior to freeze-drying.

A further embodiment of the present invention is a product produced according to the process of the present invention.

In one embodiment of the present invention, the process comprises a further step which can be carried out at the same time as step c) or as a separate step:

d) pressing said moulded article on which said coating dispersion has been applied, optionally under heating.

In one embodiment of the present invention the viscosity of the coating dispersion is 5-2000 mPas, such as 10-500 mPas as determined with Brookfield, i.e. Brookfield viscosity determined at 100 rpm according to standard SCAN-P 50:84.

In one embodiment of the present invention, the surface roughness of the moulded article prior to coating, determined as Parker Print-Surf roughness (PPS), is at least 1.0 µm, such as 2.0 µm.

In one embodiment of the present invention, the dry content of the moulded article prior to coating is more than 50% by weight, such as more than 60% by weight, more than 70% by weight, more than 80% by weight or more than 90% by weight. Thus, in one embodiment of the present invention the moulded article is at least partly dried prior to applying the coating according to the present invention. In one embodiment of the invention, the moulded article is, at least partly, being dried or dewatered after the coating suspension has been applied. In one embodiment, the moulded article and the coating suspension are being dried at the same time.

In one embodiment of the present invention, the contact angle of a water drop placed on the surface of the coated moulded article is more than 60° such as more than 80° or more than 90°. The contact angle can be determined using methods known in the art. The contact angle is determined for a dry surface in standardized conditions.

In one embodiment of the present invention, the KIT value of the coated moulded article is typically at least 5. The KIT value can be determined using methods known in the art such as the TAPPI UM 557 method.

In one embodiment of the present invention, the components of the coating dispersion are co-refined, homogenized, fluidized or high-shear mixed together.

DETAILED DESCRIPTION

The microfibrillated cellulose content of the coating layer may, according to one embodiment, be in the range of from 0.01 to 99.9 weight-% based on the weight of solids of the coating layer. In one embodiment, the microfibrillated cellulose content of the coating layer may be in the range of 70 to 99 weight-%, in the range of 80 to 99 weight-%, or in the range of from 90 to 99 weight-% of the solids of the coating layer.

Microfibrillated cellulose (MFC) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods.

The smallest fibril is called elementary fibril and has a diameter of approximately 2-4 nm (see e.g. Chinga-Carrasco, G., *Cellulose fibres, nanofibrils and microfibrils: The morphological sequence of MFC components from a plant physiology and fibre technology point of view, Nanoscale research letters* 2011, 6:417), while it is common that the aggregated form of the elementary fibrils, also defined as microfibril (Fengel, D., *Ultrastructural behavior of cell wall polysaccharides*, Tappi J., March 1970, Vol 53, No. 3.), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregates and cellulose microfibril aggregates. MFC can also be characterized by various physical or physical-chemical properties such as large surface area or its ability to form a gel-like material at low solids (1-5 wt %) when dispersed in water. The cellulose fiber is preferably fibrillated to such an extent that the final specific surface area of the formed MFC is from about 1 to about 300 $m^2/g$, such as from 1 to 200 $m^2/g$ or more preferably 50-200 $m^2/g$ when determined for a freeze-dried material with the BET method.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CM), aldehyde and/or carboxyl groups (cellulose obtained by N-oxyl mediated oxydation, for example "TEMPO"), or quaternary ammonium (cationic cellulose). After being modified or oxidized in one of the above-described methods, it is easier to disintegrate the fibers into MFC or nanofibrillar size fibrils.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, single- or twin-screw extruder, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated. MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or chemi-mechanical pulps. It can also be made from broke or recycled paper.

The above described definition of MFC includes, but is not limited to, the new proposed TAPPI standard W13021 on cellulose nanofibril (CNF) defining a cellulose nanofiber material containing multiple elementary fibrils with both crystalline and amorphous regions.

The coating dispersion used in accordance with the present invention may also comprise small amounts of functional additives such as fillers, cross-linkers, colorants, optical brightening agents, co-binders, or rheology modifiers, anti-foaming agents or foaming agents, biocides, anti-microbial agents, etc.

The spraying of the coating dispersion can be carried out using methods known in the art. The spraying can for example be electrostatically assisted or ultrasound assisted. It can also be performed by a co-axial spray nozzle or by the use of a rotary disk atomizer. Whilst a single spraying may be sufficient, it also possible to carry out repeated sprayings using the same or different compositions.

In one embodiment of the present invention, the spraying of the coating dispersion is carried out while the moulded article is still in its mould. In one embodiment, a vacuum is still applied to the mould when the spraying is carried out. In one embodiment of the present invention the coating dispersion is sprayed onto the mould, such as on the male part or female part or both and then applied to the moulded article when said moulding takes place in the mould.

Typically, the coating dispersion applied to the moulded article dries quickly. In one embodiment, the drying time of the coating is in the range of from 1 s to 60 s, which avoids bubble and pinhole formation and leads to a glossy surface with minimum pore formation. The air permeance can be measured by methods known in the art, for example according to SCAN P 60:87 (Bendtsen air permeance). In one embodiment of the present invention, the drying may be performed under pressure, i.e. pressure can be applied during drying. The drying temperature is typically in the range of from 20° C. to 250° C., such as 30° C. to 200° C. or 40° C. to 190° C. The drying can for example be performed on drying plates or forms. Forming of the moulded article after coating can be made under vacuum (suction), optionally with heat applied.

EXAMPLES

Example 1

Samples (blotting papers) were coated with MFC containing CMC (FF30, 2 kg/t) and AKD (Aquapel, 5 kg/t) by using an electric hand-held paint sprayer (Graco EasyMax WP II 230V).

A mixture of MFC, CMC and AKD was sprayed on the blotting paper in three different consistencies (3, 4, and 5%) and the samples were dried in contact with a hot plate (170° C.) for 3×30 seconds. Between these 30 second long dryings the blotting paper was allowed to cool for 5 seconds in room temperature. The MFC coat weight on blotting paper was determined and the coating layer integrity was tested with a coloring solution in accordance with the European standard (EN 13676 2001) in order to detect pinholes in the MFC coating layer. The reagents in the coloring solution were dyestuff E131 Blue and ethanol ($C_2H_5OH$, 96%). The color solution consisted of 0.5 g of dyestuff dissolved in 100 mL of ethanol.

Grease resistance of the coated materials was evaluated by the KIT-test. The test uses a series of mixtures of castor oil, toluene and heptane. As the ratio of oil to solvent is decreased, the viscosity and surface tension also decrease, making successive mixtures more difficult to holdout. The performance is rated by the highest numbered solution which does not darken the sheet after 15 seconds. The highest numbered solution (the most aggressive) that remains on the surface of the paper without causing failure is reported as the "kit rating" (maximum 12). The Kit test is used to quantify or compare the performance of papers and boards, used for food contact and other packaging applications where resistance to grease staining is important. The method is useful for fluorochemical-treated papers, but it is not applicable to pure greaseproof papers. Thus, high KIT-value for MFC treated surfaces also indicates high solvent barrier property of the coating.

TABLE 1

Average coat weights in the test points and KIT test results

| Test point | MFC (g/m^2) | average MFC (g/m$^2$) | KIT-value |
|---|---|---|---|
| 1.1 | 3.50 | 3.95 | 12 |
| 1.2 | 4.40 | | 12 |
| 2.1 | 4.45 | 5.03 | 12 |
| 2.2 | 5.61 | | 12 |
| 3.1 | 6.12 | 5.26 | 12 |
| 3.2 | 4.41 | | 12 |

Example 2

Samples (moulded packaging plates, molded disposable tableware plates) were coated with MFC (fines content based on Bauer-McNett is 100%) containing CMC (FF30, 2 kg/t) and AKD (Aquapel, 5 kg/t) by using an electric hand-held paint sprayer (Graco EasyMax WP II 230V).

A mixture of MFC, CMC and AKD was sprayed on the moulded packaging plates in two different consistencies (3% and 5%) before the first drying unit. After applying the MFC spray the samples were dried in contact with a hot plates (170° C.) for 3×30 seconds.

It was noticed that the samples became grease-resistant and the surface was much glossier than with fluorochemical treated or non-treated sample. Based on KIT-test it was possible to produce non-fluorochemical treated grease and solvent resistant moulded packages with MFC spray, see Table 2.

TABLE 2

Results from the materials

| Test Point | Air permeance Gurley, s | Air permeance Bendtsen, ml/min | Gloss, % | KIT-value |
|---|---|---|---|---|
| Non-fluorochemical treated | 19 ± 3 | 622 ± 134 | 3.5 ± 0.1 | 1 |
| Fluorochemical treated | 9 ± 1 | 1277 ± 168 | 3.1 ± 0.2 | 5 |
| MFC 3% spray | 311 ± 23 | 36 ± 4 | 12.2 ± 1.2 | 6 |
| MFC 5% spray | 358 ± 40 | 41 ± 10 | 13.8 ± 2.0 | 7-8* |

*depending on sample

Fluorochemical treated samples showed increased air permeability compared to non-fluorochemical treated samples measured by the Gurley-Hill and Bendtsen methods. Samples treated with MFC spray showed significant reduction (ca. 95% reduction) in air permeability compared to non-fluorochemical treated samples measured by the Gurley-Hill and Bendtsen methods.

Samples treated with MFC spray showed significant increase (>400%) in surface glossiness of the plates compared to both non-fluorochemical and fluorochemical treated samples.

In view of the above detailed description of the present invention, other modifications and variations will become apparent to those skilled in the art. However, it should be apparent that such other modifications and variations may be effected without departing from the spirit and scope of the invention.

The invention claimed is:

1. A process for providing a coating layer on a surface of a moulded article, said coating layer comprising 1-10 g/m$^2$ microfibrillated cellulose, comprising the steps of:
   a) providing a moulded article comprising fibers;
   b) applying a coating dispersion on the surface of said moulded article, wherein said coating dispersion comprises microfibrillated cellulose, at least one slip aid and at least one hydrocolloid, wherein said slip aid is alkyl ketene dimer, wherein the amount of the at least one slip aid is 1-20 wt % of a dry weight of said coating layer, and wherein the amount of hydrocolloid is 1-20 kg per ton of dry solids of the coating dispersion;
   c) drying said applied coating dispersion to form the coating layer; and
   d) pressing said moulded article, under heating, on which said coating dispersion has been applied, wherein pressing said moulded article takes place at the same time as step c) or as a separate step from step c).

2. A process according to claim 1, wherein the amount of slip aid is 1-10 kg per ton of dry solids of the coating dispersion.

3. A process according to claim 1, wherein the hydrocolloid is carboxymethyl cellulose, galactoglucomannan, or xyloglucan.

4. A process according to claim 1, wherein the microfibrillated cellulose has a Schopper Riegler number of at least 90.

5. A process according to claim 1, wherein the coating dispersion is applied to the moulded article by spraying.

6. A coated moulded article obtained by the process of claim 1.

7. A process for providing a coating layer on a surface of a moulded article, said coating layer comprising 1-10 g/m² microfibrillated cellulose, comprising the steps of:
   a) providing a moulded article comprising fibers;
   b) applying a coating dispersion on the surface of said moulded article, wherein said coating dispersion comprises microfibrillated cellulose, at least one slip aid and at least one hydrocolloid, wherein the microfibrillated cellulose has a Schopper Riegler number of at least 90, wherein said slip aid is alkyl ketene dimer, and wherein the hydrocolloid is carboxymethyl cellulose, galactoglucomannan, or xyloglucan;
   c) drying said applied coating dispersion to form the coating layer; and
   d) pressing said moulded article, under heating, on which said coating dispersion has been applied, wherein pressing said moulded article takes place at the same time as step c) or as a separate step from step c).

8. A process according to claim 7, wherein the amount of slip aid is 1-10 kg per ton of dry solids of the coating dispersion, or wherein the amount of hydrocolloid is 1-20 kg per ton of dry solids of the coating dispersion, or both.

9. A process according to claim 7, wherein the coating dispersion is applied to the moulded article by spraying.

10. A coated moulded article obtained by the process of claim 7.

\* \* \* \* \*